(12) United States Patent
Izumi

(10) Patent No.: US 10,555,033 B2
(45) Date of Patent: Feb. 4, 2020

(54) RELAY DEVICE, TERMINAL DEVICE, COMMUNICATION SYSTEM, PDU RELAY METHOD, PDU RECEPTION METHOD, AND PROGRAM

(71) Applicant: NEC Corporation, Tokyo (JP)

(72) Inventor: Tomofumi Izumi, Tokyo (JP)

(73) Assignee: NEC Corporation, Tokyo (JP)

( * ) Notice: Subject to any disclaimer, the term of this patent is extended or adjusted under 35 U.S.C. 154(b) by 72 days.

(21) Appl. No.: 15/579,740

(22) PCT Filed: May 26, 2016

(86) PCT No.: PCT/JP2016/065590
§ 371 (c)(1),
(2) Date: Dec. 5, 2017

(87) PCT Pub. No.: WO2016/199587
PCT Pub. Date: Dec. 15, 2016

(65) Prior Publication Data
US 2018/0167664 A1    Jun. 14, 2018

(30) Foreign Application Priority Data

Jun. 12, 2015 (JP) .................................. 2015-119075

(51) Int. Cl.
*H04N 21/438* (2011.01)
*H04N 21/238* (2011.01)
(Continued)

(52) U.S. Cl.
CPC ....... *H04N 21/4382* (2013.01); *H04N 21/238* (2013.01); *H04N 21/6587* (2013.01); *H04L 67/06* (2013.01)

(58) Field of Classification Search
CPC ............................ H04N 21/4382; H04L 67/06
See application file for complete search history.

(56) References Cited

U.S. PATENT DOCUMENTS 7,395,348 B1 * 7/2008 Cieslak ................ H04L 45/306
709/232
8,281,350 B2   10/2012 Ozawa
(Continued)

FOREIGN PATENT DOCUMENTS

JP   2001-069480      3/2001
JP   2009-246990      10/2009
(Continued)

OTHER PUBLICATIONS

Extended European search report, for Application No. 16807294.0, dated Oct. 29, 2018.
(Continued)

*Primary Examiner* — Jerry B Dennison
(74) *Attorney, Agent, or Firm* — Young & Thompson

(57) ABSTRACT

Provided is a relay device for transferring a protocol data unit (PDU) transmitted from a server device to a terminal device, receiving content information that pertains to content stored in the PDU, and controlling a transfer in the PDU transfer step on the basis of the content information. The terminal device receives, via the relay device, the PDU transmitted from the server device, and transmits the content information that pertains to the content stored in the PDU to the relay device.

5 Claims, 7 Drawing Sheets

(51) Int. Cl.
    *H04N 21/6587*     (2011.01)
    *H04L 29/08*     (2006.01)

(56) References Cited

U.S. PATENT DOCUMENTS

| | | |
|---|---|---|
| 2004/0213152 A1 | 10/2004 | Matsuoka et al. |
| 2007/0201563 A1 | 8/2007 | Yamaguchi et al. |
| 2011/0099286 A1 | 4/2011 | Krikorian et al. |
| 2014/0146669 A1 | 5/2014 | Ozawa |
| 2014/0250168 A1 | 9/2014 | Damola et al. |
| 2018/0167664 A1* | 6/2018 | Izumi .................. G06F 13/00 |

FOREIGN PATENT DOCUMENTS

| | | |
|---|---|---|
| TW | 200904190 | 1/2009 |
| WO | WO 2005/119991 | 12/2005 |
| WO | WO 2014/200399 | 12/2014 |

OTHER PUBLICATIONS

International Search Report, PCT/JP2016/065590, dated Aug. 2, 2016.

Taiwanese Office Action dated Aug. 28, 2018 in corresponding Taiwanese Patent Application No. 105116947 with partial English translation.

* cited by examiner

| TYPE OF CONTENT | CONTENT INFORMATION | TRANSFER CONTROL |
|---|---|---|
| MOVING IMAGE | TYPE OF CONTENT, SIZE OF CONTENT, REPRODUCTION TIME | PACING |
| DOCUMENT | TYPE OF CONTENT | TCP OPTIMIZATION |
| IMAGE | TYPE OF CONTENT | TCP OPTIMIZATION |
| SOUND | TYPE OF CONTENT | TCP OPTIMIZATION |
| DOWNLOAD | TYPE OF CONTENT | TCP OPTIMIZATION |

RELAY DEVICE, TERMINAL DEVICE, COMMUNICATION SYSTEM, PDU RELAY METHOD, PDU RECEPTION METHOD, AND PROGRAM

TECHNICAL FIELD

The present invention relates to a relay device, a terminal device, a communication system, a protocol data unit (PDU) relay method, a PDU reception method, and a program.

BACKGROUND ART

Relay devices configured to relay communication between a server device and a terminal device may perform transfer control according to details of content to be transferred (for example, web access, moving-image viewing, a file transfer, a video conference, or the like). Also, data transmission using encrypted communication for preventing information from being leaked is known.

In Patent Document 1 and 2, technology in which a cable television relay device performs limited reception management without descrambling content is disclosed.

CITATION LIST

Patent Literature

Patent Literature 1: Japanese Unexamined Patent Application, First Publication No. 2001-69480
Patent Literature 2: Japanese Unexamined Patent Application, First Publication No. 2009-246990

SUMMARY OF INVENTION

Technical Problem

If the communication between the server device and the terminal device is encrypted, the relay device cannot identify details of the transferred content. Thus, when communication between the server de vice and the terminal device is encrypted, the relay device cannot perform transfer control according to the details of the transferred content.

In the inventions described in Patent Document 1 and 2, it is possible to provide appropriate transfer control because it is known that the data relayed by the relay device is cable television content. However, even if the inventions described in Patent Document 1 and 2 are applied to relay devices capable of relaying different types of content, it is not possible to perform transfer control according to the details of the content.

An objective of the present invention Is to provide a relay device, a terminal device, a communication system, a PDU relay method, a PDU reception method, and a program for solving the above-described problems.

Solution to Problem

According to a first aspect of the present invention, a relay device includes a PDU transfer unit configured to transfer a PDU transmitted from a server device to a terminal device; a content information reception unit configured to receive content information which is information about content stored in the PDU; and a transfer control unit configured to control a transfer by the PDU transfer unit on the basis of the content information.

According to a second aspect of the present invention, a terminal device includes a PDU reception unit configured to receive, via a relay device, a PDU transmitted from a server device; and a content information transmission unit configured to transmit contest information which is information about content stored in the PDU to the relay device.

According to a third aspect of the present invention, a communication system includes the relay device according to the above-described first aspect; and the terminal device according to the above-described second aspect.

According to a fourth aspect of the present invention, a PDU relay method includes a PDU transfer step of transferring a PDU transmitted from a server device to a terminal device; a content information reception step of receiving content information which is information about content stored in the PDU; and a transfer control step of controlling a transfer in the PDU transfer step on the basis of the content information.

According to a fifth aspect of the present invention, a PDU reception method includes a PDU reception step of receiving, via a relay device, a PDU transmitted from a server device; and a content information transmission step of transmitting content information which is information about content stored in the PDU to the relay device.

According to a sixth aspect of the present invention, a program causes a computer to function as: a PDU transfer unit configured to transfer a PDU transmitted from a server device to a terminal device; a content information reception unit configured to receive content information which is information about content stored in the PDU; and a transfer control unit configured to control a transfer by the PDU transfer unit on the basis of the content information.

According to a seventh aspect of the present invention, a program causes a computer to function as: a PDU reception unit configured to receive, via a relay device, a PDU transmitted from a server device; and a content information transmission unit configured to transmit content information which is information about content stored in the PDU to the relay device.

Advantageous Effects of Invention

According to at least one of the above-described aspects of the present invention, the relay device receives the content information about the content stored in the transferred PDU and controls the transfer of the PDU on the basis of the content information. Thereby, even when the communication between the server device and the terminal device is encrypted, the relay device can perform transfer control according to details of the transferred content.

DESCRIPTION OF EMBODIMENTS

<<First Embodiment>>

The first embodiment will be described.

Figure 1:
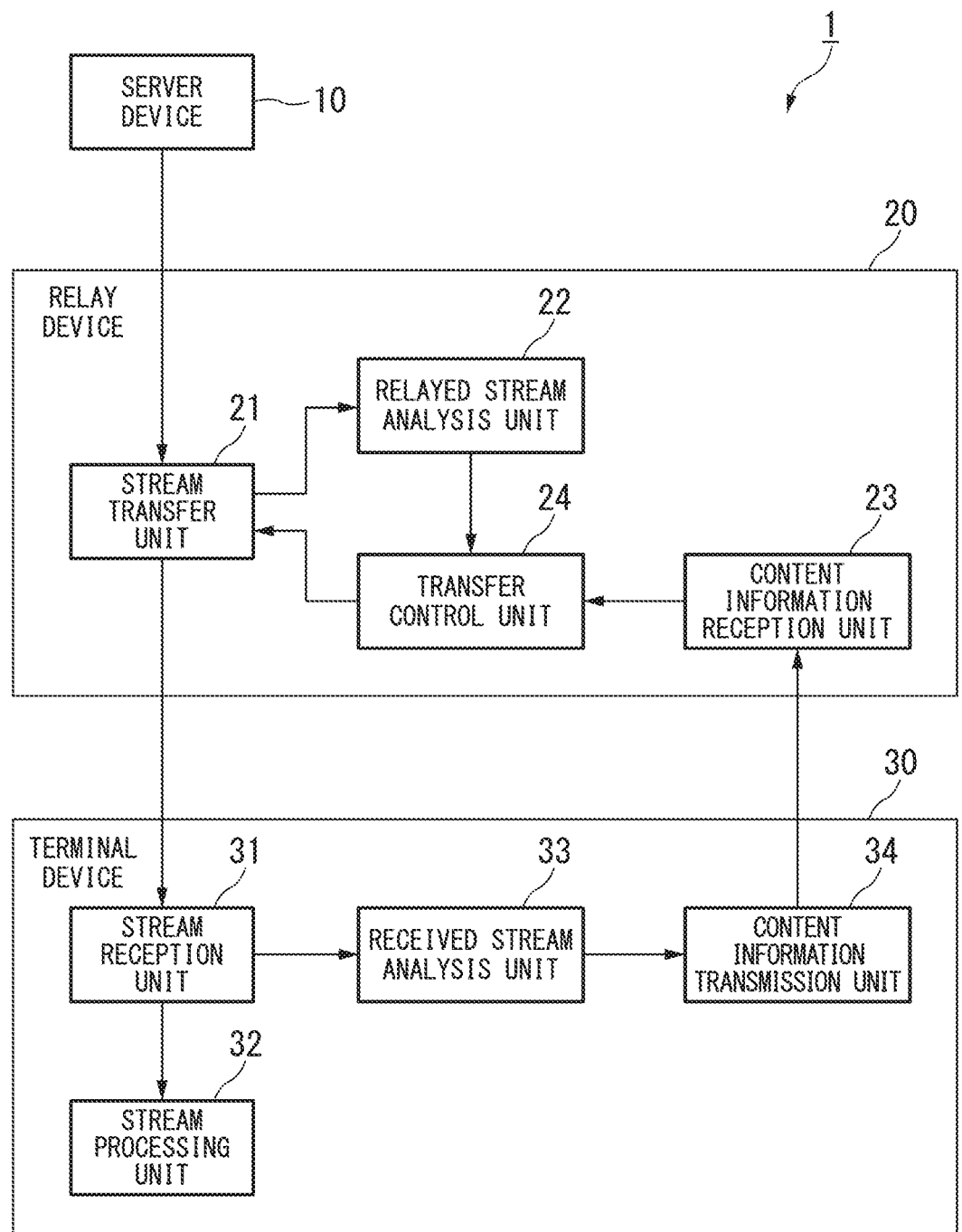
FIG. 1 is a schematic block diagram illustrating a configuration of a communication system according to a first embodiment.

FIG. 1 is a schematic block diagram illustrating a configuration of a communication system according to the first embodiment.

The communication system 1 includes a server device 10 configured to transmit a stream, a relay device 20 configured to relay the stream, and a terminal device 30 configured to receive the stream.

For example, the stream is encrypted according to transport layer security (TLS). The stream is an example of a protocol data unit (PDU) which is a data transmission unit.

The relay device 20 includes a stream transfer unit 21, a relayed stream analysis unit 22, a content information reception unit 23, and a transfer control unit 24.

The stream transfer unit 21 transfers the stream transmitted from the server device 10 to the terminal device 30.

If the stream is not encrypted, the relayed stream analysis unit 22 analyzes the stream received from the server device 10 by the stream transfer unit 21 and generates content information indicating details of the content included in the stream. If the stream is encrypted, the relayed stream analysis unit 22 cannot analyze the stream.

The content information reception unit 23 receives the content information indicating the details of the content Included in the relayed stream and a reception port number in the terminal device 30 of the stream from the terminal device 30.

The transfer control unit 24 controls a transfer of the stream by the stream transfer unit 21 on the basis of the content information received by the content information reception unit 23.

Figures 2, 3:
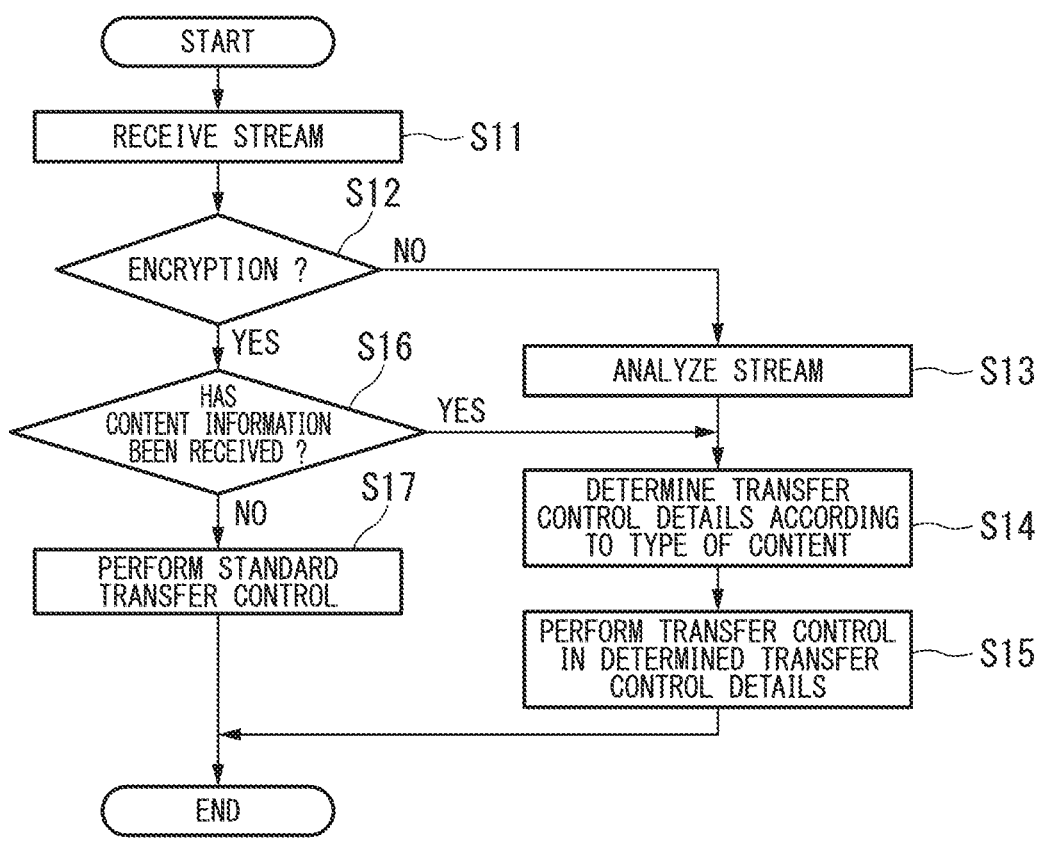
FIG. 2 is a diagram illustrating a relationship between content information and transfer control for each type of content.
FIG. 3 is a flowchart illustrating an operation of a relay device according to the first embodiment.

FIG. 2 is a diagram illustrating a relationship between content information and transfer control for each type of content.

Information stored in the content information received by the content information reception unit 23 and the transfer control by the transfer control unit 24 differ according to a type of content.

In the content information according to the present embodiment, a type of content (a document, an image, a moving image, sound, or the like) is stored. If the type of content is the moving image, the content information further stores a size of content and a reproduction time of the content.

The type of content is identified on the basis of Content-type stored in a header of a hypertext transfer protocol (HTTP) response.

The size of content is identified on the basis of Content-Length stored in a header of the HTTP response.

Also, the reproduction time of moving-image content is identified by analyzing the header of the moving-image data stored in a pay load of the HTTP response.

Also, if the type of content indicated by the content information is the moving image, the transfer control unit 24 performs the pacing of the stream. The pacing is control of a transmission rate in accordance with a bit rate of the content. The bit rate of the content is calculated by dividing the size of content by the reproduction time.

Also, if the type of content indicated by the content information is not the moving image, the transfer control unit 24 performs transmission control protocol (TCP) optimization control according to the type of content. An example of the TCP optimization control is setting of an initial value of a congestion window (a value for adjusting an amount of data that is capable of being transmitted depending on a communication situation) according to the type of content.

The terminal device 30 includes a stream reception unit 31, a stream processing unit 32, a received stream analysis unit 33, and a content information transmission unit 34.

The stream reception unit 31 receives the stream transmitted from the server device 10 via the relay de vice 20. If the stream is encrypted, the stream reception unit 31 decrypts the stream.

The stream processing unit 32 executes a process according to the content stored in the stream decrypted by the stream reception unit 31. Examples of processes corresponding to the content include reproduction of moving images or sound, display of documents or images, and the like.

The received stream analysis unit 33 analyzes the stream received by the stream reception unit 31 and generates content information indicating details of the content stored in the stream.

The content information, transmission unit 34 transmits the type of content generated by the received stream analysis unit 33 and the reception port number at which the stream reception unit 31 receives the stream, to the relay device 20.

The operation of the relay device 20 according to the present embodiment will be described. Every time the relay device 20 receives the stream from the server device 10, a process shown hereinafter is performed.

FIG. 3 is a flowchart illustrating an operation of the relay device according to the first embodiment.

When the stream transfer unit 21 of the relay device 20 receives the stream from the server device 10 (step S11), the relayed stream analysis unit 22 determines whether or not the stream has been encrypted (step S12).

If the received stream has not been encrypted (step S12: NO), the relayed stream analysis unit 22 analyzes the stream and generates content information (step S13).

Next, the transfer control unit 24 determines transfer control details according to the type of content on the basis of the content information generated by the relayed stream analysis unit 22 (step S14). The transfer control unit 24 performs control for causing the stream transfer unit 21 to transfer the stream received in step S11 to the terminal device 30 on the basis of the determined transfer control details (step S15). Thereby, the relay device 20 can perform transfer control according to details of the transferred content.

On the other hand, if the received stream is encrypted (step S12: YES), the content information reception unit 23 determines whether or not the content information related to the stream has been received from the terminal device 30 (step S16). The content information related to the stream is content information received together with the reception port number of a transfer destination of the stream.

If the content information related to the stream has not been received (step S16: NO), the transfer control unit 24 performs control for causing the stream transfer unit 21 to transfer the stream received in step S11 to the terminal device 30 on the basis of standard transfer control (step S17). An example of the standard transfer control is a TCP level optimization process.

On the other hand, if the content information reception unit 23 has received the content information (step S16: YES), the transfer control unit 24 determines transfer control details according to the type of content on the basis of content information received by the content information reception unit 23 (step S14). The transfer control unit 24 performs control for causing the stream transfer unit 21 to transfer the stream received in step S11 to the terminal device 30 on the basis of the determined transfer control details (step S15). Thereby, the relay device 20 can perform transfer control according to the details of the transferred content.

Next, the operation of the terminal device 30 according to the present embodiment will be described. Every time the terminal device 30 receives the stream from the relay device 20, a process shown hereinafter is performed.

Figure 4:
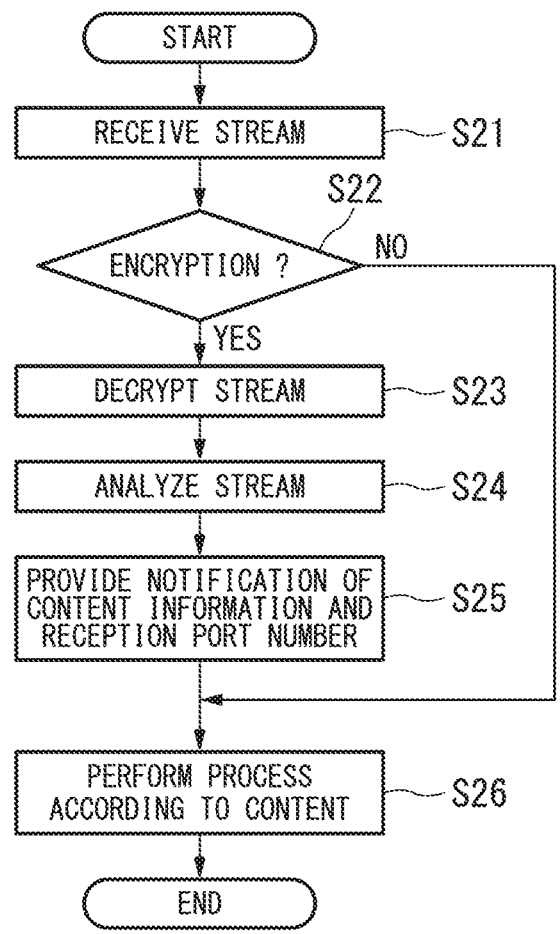
FIG. 4 is a flowchart illustrating am operation of a terminal device according to the first embodiment.

FIG. 4 is a flowchart illustrating the operation of the terminal device according to the first embodiment.

When the stream is received from the relay device 20 (step S21), the stream reception unit 31 of the terminal device 30 determines whether or not the stream has been encrypted (step S22).

If the received stream has been encrypted (step S22: YES), the stream reception unit 31 decrypts the stream by a predetermined method (step S23). Next, the received stream analysis unit 33 analyzes the decrypted stream and generates content information (step S24). Next, the content information transmission unit 34 notifies the relay device 20 of the content information generated by the received stream analysis unit 33 and a reception port number of the stream (step S23).

On the other hand, if the stream received by the stream reception unit 31 has not been encrypted (step S22: NO) or if the content information transmission unit 34 has provided a notification of the content information in the above-described step S25, the stream processing unit 32 performs a process according to the content with respect to the received and decrypted stream (step S26).

Next, the behavior of the entire communication system 1 due to the relay device 20 and the terminal device 30 performing the above-described process will be described. Here, an operation of the communication system 1 when the stream is encrypted will be described.

Figure 5:
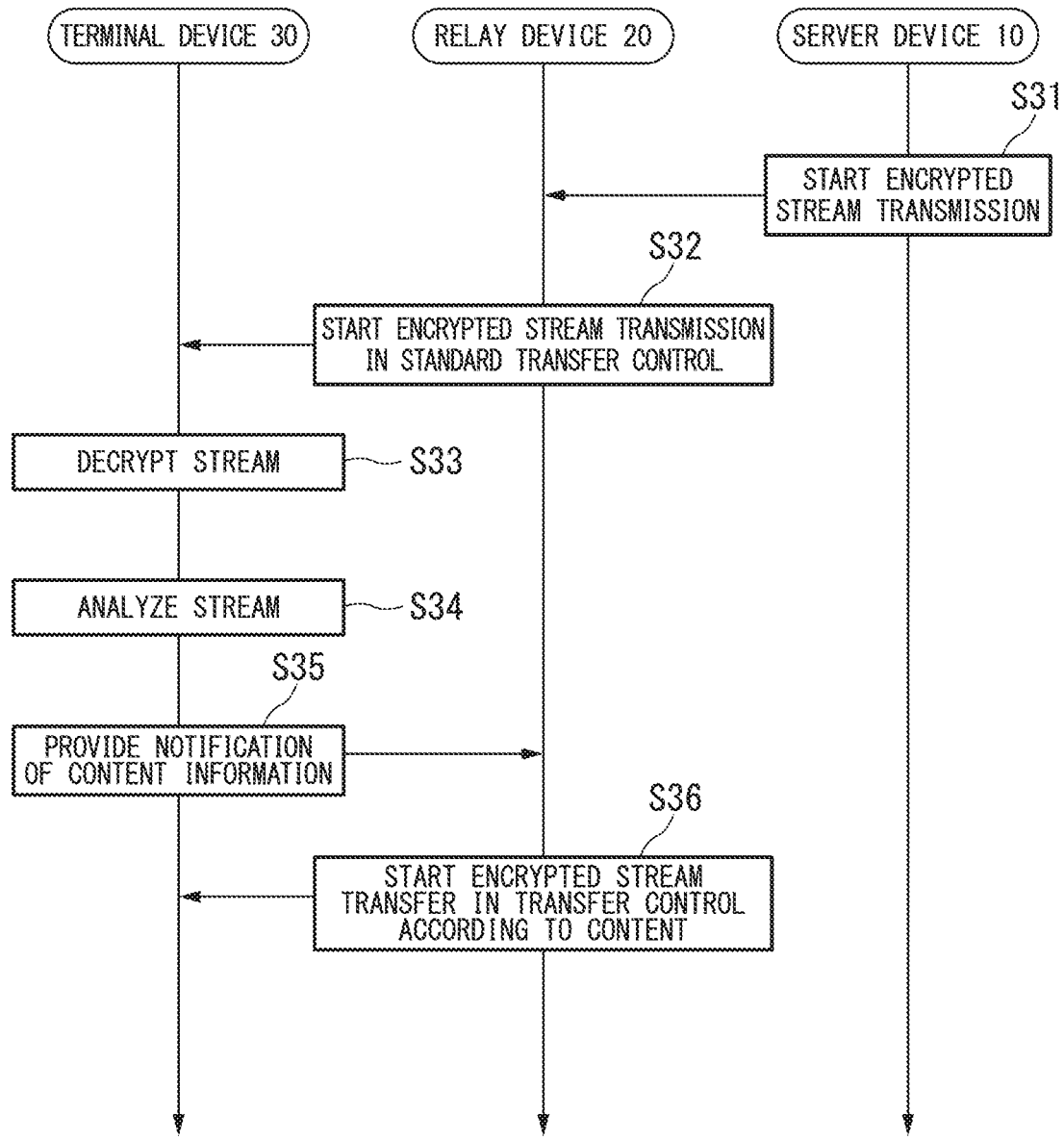
FIG. 5 is a sequence diagram illustrating an example of communication of a communication system, according to the first embodiment.

FIG. 5 is a sequence diagram illustrating an example of communication in the communication system according to the first embodiment.

When the server device 10 starts transmission of an encrypted stream (step S31), the relay device 20 receives the stream. Because the stream is encrypted and cannot be analyzed in the relay device 20, the relay device 20 starts transfer control of the stream based on the standard transfer control (step S32).

When the stream is received, the terminal device 30 decrypts the stream (step S33). The terminal device 30 analyzes the decrypted stream and generates content information (step S34). Then, the terminal device 30 notifies the relay device 20 of the content information (step S35).

When the content information is received from the terminal device 30, the relay device 20 switches transfer control from the standard transfer control to the transfer control according to the type of content (step S36). There-after, a transfer of the stream to be transferred by the relay device 20 is controlled on the basis of the content information.

As described above, according to fee present embodiment, the relay device 20 includes the stream transfer unit 23 configured to transfer the stream transmitted from the server device 10 to the terminal device 30, the content information reception unit 23 configured to receive the content information which is information about the content stored in the stream, and the transfer control unit 24 configured to control a transfer by the stream transfer unit 21 on the basis of the content information.

Thereby, even when the communication between the server device 10 and the terminal device 30 is encrypted, the relay device 20 can perform the transfer control according to details of the transferred content on the basis of the content information.

Also, the content information reception unit 23 according to the present embodiment receives the content information and the reception port number of the stream from the terminal device 30. Also, the transfer control unit 24 controls the transfer of the stream by the stream transfer unit 21 to the reception port of the reception port number of the terminal device 30 on the basis of the content information.

Thereby, the relay device 20 can identify the stream serving as a control target based on the content information.

Also, the transfer control unit 24 according to the present embodiment determines whether there is a necessity for pacing of the stream on the basis of the type of content included in the content information. Thereby, the relay device 20 can perform pacing on only content for which pacing is necessary in the stream.

<<Second Embodiment>>

The second embodiment will be described.

Figure 6:
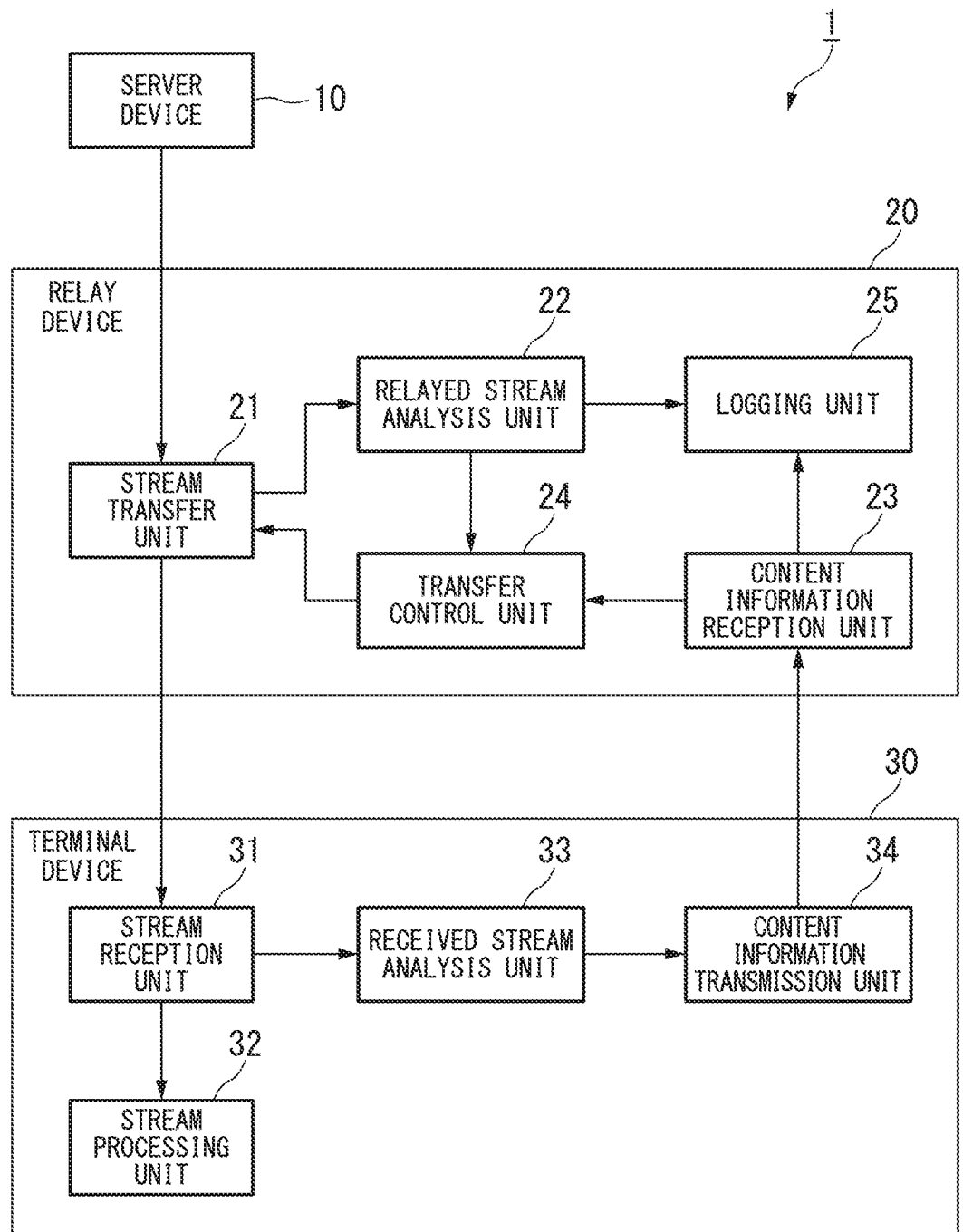
FIG. 6 is a schematic block diagram illustrating a configuration of a communication system, according to a second embodiment.

FIG. 6 is a schematic block diagram illustrating a configuration of a communication system according to the second embodiment.

In a communication system 1 according to the present embodiment, a relay device 20 performs a logging process of a stream (recording and accumulating a communication history and the like in time series) in addition to a transfer according to content.

In addition to the configuration of the first embodiment, the relay device 20 according to the second embodiment further includes a logging unit 25. The logging unit 25 performs the logging process on the basis of content information generated by a relayed stream analysis unit 22 or content information received from the terminal device 30 by a content information reception unit 23.

Specifically, the logging unit 25 extracts information about a type of stored content in the stream to be relayed, a communication fee for each type of content, and the like as log information.

Also, the relay device 20 can also appropriately perform logging on the stream relayed until content information is received by rewriting information related to a stream relayed until the reception of the content information to information corresponding to the type of content indicated by the content information.

Also, the logging unit 25 calculates an effect of reducing an amount of communication due to pacing of moving-image content. Specifically, the logging unit 25 can compute the reduction effect by comparing a size of content to be originally sent and a communication fee when the transmission is disconnected midway due to pacing.

As described above, according to the present embodiment, even when the stream is encrypted, the relay device 20 can perform a logging process according to the type of content stored in the stream. Also, the relay device 20 can compute the effect of pacing even when the stream is encrypted.

Although several embodiments have been described above in detail with reference to the drawings, specific configurations are not limited to those described above and various design changes and the like can be made.

Although the terminal device 30 generates content information related to the content stored in the stream received by the terminal device 30 and transmits the generated content information to the relay device 20 when the stream is encrypted in the above-described embodiment, the present invention is not limited thereto.

For example, in another embodiment, if the stream is encrypted, the server device 10 may transmit the content information related to the content stored in the stream to be transmitted to the relay device 20.

Also, although the relay device 20 relays the communication by the stream in the above-described embodiment, the present invention is not limited thereto.

For example, the relay device 20 according to another embodiment may relay the communication by datagram. The datagram can be encrypted by a method such as datagram transport layer security (DTLS). In this case, the relayed stream analysis unit 22 and the received stream analysis unit 33 analyze content stored in the datagram and generate content information.

Also, the relay device 20 according to another embodiment may be a relay device related to a layer, which relays frames and packets, lower than a fourth layer (a transport layer) in an OSI reference model. Also, the relay device 20 according to another embodiment may be a relay device related to a layer higher than the fourth layer.

Also, although the relay device 20 determines whether to perform pacing or whether to perform TCP optimization control on the basis of content information in the above-described embodiment, the present invention is not limited thereto.

For example, the relay device 20 according to another embodiment may determine only the necessity of pacing on the basis of the content information without performing the TCP optimization control. Also, the relay device 20 according to another embodiment may perform only the TCP optimization control according to the type of content without performing the pacing control.

Also, although the terminal device 30 according to the above-described embodiment transmits the content information to the relay device 20 without encrypting the content information, the present invention is not limited thereto.

For example, the terminal device 30 according to another embodiment may establish an encrypted stream by the TLS with the relay device 20 and transmit the content information with the stream.

Also, although the relayed stream analysis unit 22 generates the content information if the stream is not encrypted and the received stream analysis unit 33 generates the content information if the stream is encrypted in the communication system 1 according to the above-described embodiment, the present invention is not limited thereto.

For example, in the communication system 1 according to another embodiment, the received stream analysis unit 33 may generate the content information regardless of whether or not the stream is encrypted. In other words, the transfer control unit 24 of the relay device 20 according to the communication system 1 performs stream transfer control on the basis of the content information received by the content information reception unit 23 regardless of whether or not the stream is encrypted.

Also, although the relay device 20 according to the above-described embodiment receives content information indicating the details of the content and controls the transfer of the stream on the basis of the content information, the present invention is not limited thereto.

For example, the relay device 20 according to another embodiment may receive the content information indicating transfer control details according to details of content and control the transfer of the stream according to the transfer control details indicated by the content information.

<<Basic Configuration>>

Figure 7:
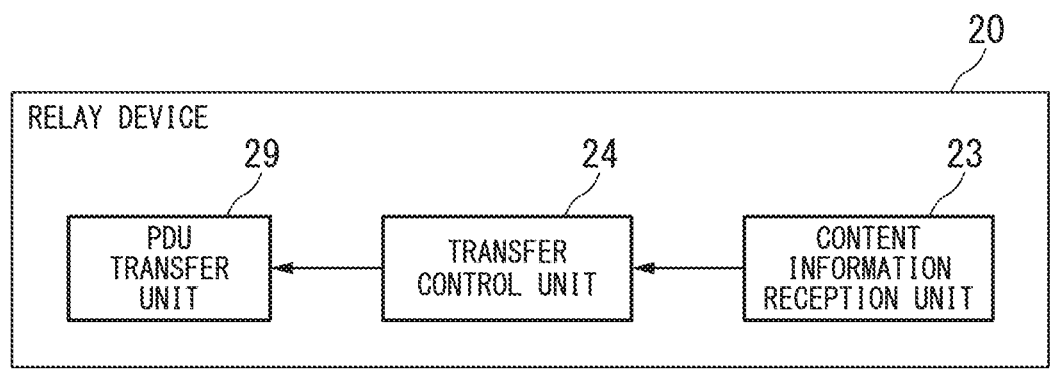
FIG. 7 is a schematic block diagram illustrating a basic configuration of a relay device.

FIG. 7 is a schematic Block diagram illustrating the basic configuration of the relay device.

Although the configurations illustrated in FIGS. 1 and 6 have been described as embodiments of the relay device 20 in the above-described embodiments, the basic configuration of the relay device 20 is as illustrated in FIG. 7.

That is, the relay device 20 has a PDU transfer unit 29, a content information reception unit 23, and a transfer control unit 24 as basic components.

The PDU transfer unit 29 transfers the PDU transmitted from the server device to the terminal device. The stream transfer unit 21 according to the above-described embodiment is an example of the PDU transfer unit 29.

The content information reception unit 23 receives content information which is information related to the content stored in the PDU.

The transfer control unit 24 controls a transfer by the PDU transfer unit 29 on the basis of the content information.

Thereby, even when the communication between the server device and the terminal device is encrypted, the relay device 20 can perform transfer control according to details of the transferred content.

Figure 8:
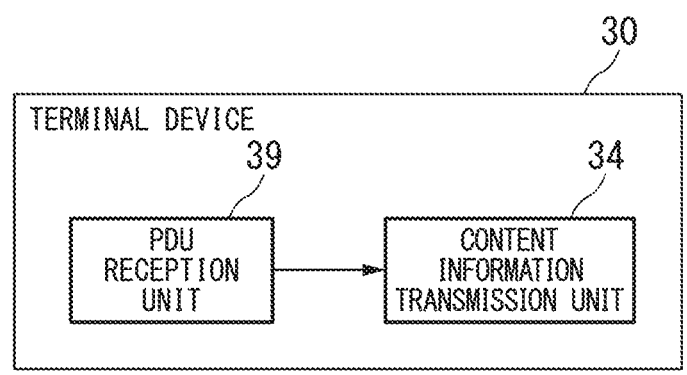
FIG. 8 is a schematic block diagram illustrating a basic configuration of a terminal device.

FIG. 8 is a schematic block diagram illustrating the basic configuration of the terminal device.

Although the configuration illustrated in FIGS. 1 and 6 has been described as an embodiment of she terminal device 30 in the above-described embodiments, the basic configuration of the terminal device 30 is as illustrated in FIG. 8.

That is, the terminal device 30 uses a PDU reception unit 39 and a content information transmission unit 34 as basic components.

The PDU reception unit 39 receives the PDU transmitted from the server device via the relay device.

Also, the stream reception unit 31 according to the above-described embodiment is an example of the PDU reception unit 39.

The content information transmission unit 34 transmits content information, which is information about the content stored in the PDU, to the relay device.

Thereby, even when the communication between the server device and the terminal device 30 is encrypted, the terminal device 30 can cause the relay device to execute transfer control according to details of content to be transferred.

Figure 9:
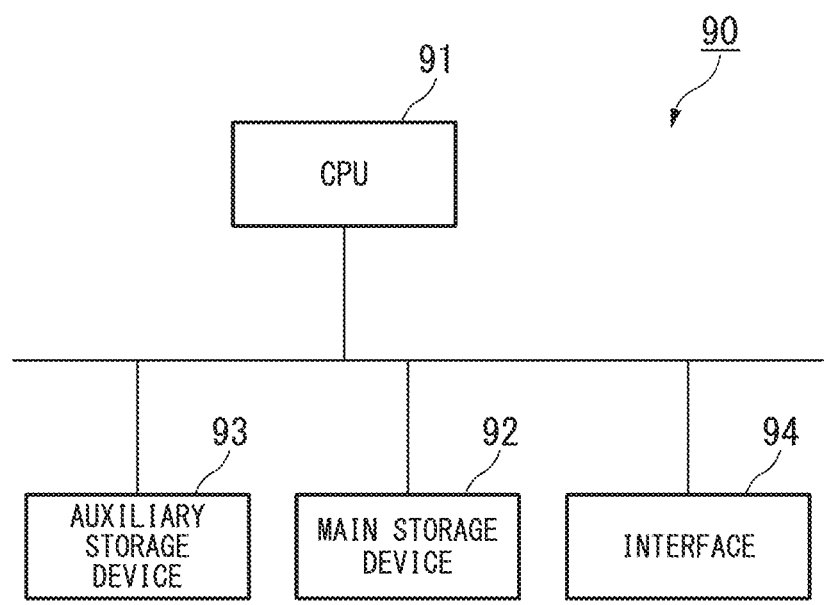
FIG. 9 is a schematic block diagram illustrating a configuration of a computer according to at least one embodiment.

FIG. 9 is a schematic block diagram illustrating a configuration of a computer according to at least one embodiment.

The computer 90 includes a CPU 91, a main storage device 92, an auxiliary storage device 93, and an interface 94.

The server device 10, the relay device 20, and the terminal device 30 described above are mounted on the computer 90. Operations of the processing units described above are stored in the auxiliary storage device 93 in the form of a program. The CPU 91 reads the above-described program, from the auxiliary storage device 93, loads the program to the main storage device 92, and executes the above-described process according to the program.

Also, in at least one embodiment, the auxiliary storage device 93 is an example of a non-transitory tangible medium. Other examples of non-transitory tangible media include a magnetic disk, a magneto-optical disk, a CD-ROM, a DVD-ROM, a semiconductor memory, and the like connected via the interface 94.

Also, if this program is distributed to the computer 90 through communication line, the computer 90 receiving the distributed program may load the program to the main storage device 92 and execute the above-described process.

Also, the program may be for implementing some of the above-described functions.

Furthermore, the program may be a so-called differential file (a differential program) that implements the above-described function by a combination with another program already stored in the auxiliary storage device 93.

This application claims priority based on Japanese Patent Application No. 2015-119075, filed on Jun. 12, 2015, the entire disclosure of which is incorporated herein by reference.

INDUSTRIAL APPLICABILITY

According to the present invention, a relay device can perform transfer control according to details of content to be transferred even when communication between a server device and a terminal device is encrypted.

REFERENCE SIGNS LIST

1 Communication system
10 Server device
20 Relay device
30 Terminal device
21 Stream transfer unit
22 Relayed stream analysis unit
23 Content information reception unit
24 Transfer control unit
31 Stream reception unit
32 Stream processing unit
33 Received stream analysis unit
34 Content information transmission unit

The invention claimed is:

1. A relay device comprising:
a memory that stores a program; and
a processor that executes the program, the processor being configured to
    transfer a protocol data unit (PDU) transmitted from a server device to a terminal device,
    receive content information which is information about a type of content stored in the PDU, and
    switch the transferring of the PDU, which is transmitted from the server device, from a standard transfer control to a content-type transfer control based on the type of content on the basis of the content information that is received from the terminal device,
wherein the processor is further configured to receive, from the terminal device, the content information that is acquired by decrypting the PDU on the terminal device, when the PDU is encrypted.

2. The relay device according to claim 1,
wherein the processor is configured to
    receive the content information and identification information of a reception port in the terminal device of the PDU from the terminal device, and
    control the transferring of the PDU to the reception port on the basis of the content information, the transfer control based on the type of content.

3. The relay device according to claim 1, wherein the processor is configured to determine whether or not to execute pacing of the PDU on the basis of the content information.

4. A terminal device comprising:
a memory that stores a program; and
a processor that executes the program, the processor being configured to
    receive a protocol data unit (PDU) that is transmitted from a server device via a relay device that performs transfer control according to a standard transfer control,
    acquire, when the received PDU is encrypted, content information which is information about a type of content stored in the PDU by decrypting the PDU, and transmit the content information to the relay device, and
    receive an encrypted PDU, which is transmitted from the server device via the relay device that performs transfer control according to a content-type transfer control based on the type of content, switching from the standard transfer control, on the basis of the content information.

5. A communication system comprising:
a relay device; and
a terminal device,
wherein the relay device comprises
    a first memory that stores a first program, and
    a first processor that executes the first program, the first processor being configured to
        transfer a protocol data unit (PDU) transmitted from a server device to the terminal device,
        receive content information which is information about a type of content stored in the PDU, and
        switch the transferring of the PDU, which is transmitted from the server device, from a standard transfer control to a content-type transfer control based on the type of content on the basis of the content information that is received from the terminal device,
    the first processor being further configured to receive, from the terminal device, the content information that is acquired by decrypting the PDU on the terminal device, when the PDU is encrypted,
wherein the terminal device comprises
    a second memory that stores a second program, and
    a second processor that executes the second program, the second processor being configured to
        receive the PDU that is transmitted from the server device via the relay device that performs transfer control according to the standard transfer control,
        acquire, when the received PDU is encrypted, the content information by decrypting the PDU, and transmit the content information to the relay device, and
        receive an encrypted PDU, which is transmitted from the server device via the relay device that performs transfer control according to a content-type transfer control based on the type of content, switching from the standard transfer control, on the basis of the content information.

* * * * *